(12) United States Patent
Bates

(10) Patent No.: US 9,302,718 B2
(45) Date of Patent: *Apr. 5, 2016

(54) TRUCK BED DOOR WITH OPTIONAL EXTENSION AND ACCESSORIES

(71) Applicant: Clay Bates, Gilbert, AZ (US)

(72) Inventor: Clay Bates, Gilbert, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/707,388

(22) Filed: May 8, 2015

(65) Prior Publication Data

US 2015/0239509 A1    Aug. 27, 2015

Related U.S. Application Data

(63) Continuation of application No. 13/738,731, filed on Jan. 10, 2013, now Pat. No. 9,027,984.

(60) Provisional application No. 61/585,108, filed on Jan. 10, 2012.

(51) Int. Cl.
| | |
|---|---|
| *B62D 33/00* | (2006.01) |
| *B62D 33/027* | (2006.01) |
| *B62D 33/04* | (2006.01) |
| *B60J 7/10* | (2006.01) |
| *B62D 47/00* | (2006.01) |
| *B60J 5/04* | (2006.01) |
| *B60J 5/10* | (2006.01) |
| *B60P 7/02* | (2006.01) |
| *B62D 29/00* | (2006.01) |

(52) U.S. Cl.
CPC ............. *B62D 33/027* (2013.01); *B60J 5/0476* (2013.01); *B60J 5/108* (2013.01); *B60J 7/10* (2013.01); *B60J 7/106* (2013.01); *B60P 7/02* (2013.01); *B62D 29/00* (2013.01); *B62D 33/0273* (2013.01); *B62D 33/04* (2013.01); *B62D 47/003* (2013.01)

(58) Field of Classification Search
CPC .. B62D 33/04; B62D 33/0273; B62D 47/003; B60J 7/106; B60J 5/0476; B60J 4/108
USPC ................ 296/183.1, 64, 100.02, 146.1, 147, 296/146.2, 146.5, 146.9, 156, 165
See application file for complete search history.

(56) References Cited

U.S. PATENT DOCUMENTS

| | | | | |
|---|---|---|---|---|
| 5,735,565 A | * | 4/1998 | Papai et al. ................... | 296/39.2 |
| 6,460,915 B1 | * | 10/2002 | Bedi et al. ................... | 296/183.1 |
| 6,705,666 B2 | * | 3/2004 | Lynch et al. ................... | 296/164 |

* cited by examiner

*Primary Examiner* — Joseph D Pape
(74) *Attorney, Agent, or Firm* — Schmeiser, Olsen & Watts LLP

(57) ABSTRACT

A pickup truck having an access door in a side panel of the truck bed is provided. The access door pivots between a closed positioned and an open position. The access door defines an opening in the side wall, the opening being created by the access door being moved from the closed position to the open position. The pickup truck has a cap member, the cap member releasably coupling to the side walls of the pickup bed and having a gap in one side portion thereof, the gap being positioned above the opening, such that the gap and the opening communicate with one another. The pickup truck has an extension body that releasably couples to the access door and pivots with the access door. The extension body is configured to functionally engage the gap in the cap member under the condition that the access door is in the closed position.

4 Claims, 16 Drawing Sheets

TRUCK BED DOOR WITH OPTIONAL EXTENSION AND ACCESSORIES

CROSS REFERENCE TO RELATED APPLICATIONS

This application claims priority to U.S. Patent Application to Bates entitled "TRUCK BED DOOR WITH OPTIONAL EXTENSION AND ACCESSORIES," Ser. No. 13/738,731, filed Jan. 10, 2013, which claims priority to U.S. Provisional Patent Application to Bates entitled "TRUCK BED DOOR WITH OPTIONAL EXTENSION AND ACCESSORIES," Ser. No. 61/585,108, filed Jan. 10, 2012, the disclosure of which is hereby incorporated entirely herein by reference.

BACKGROUND

1. Technical Field

The following relates generally to a utility vehicle such as a pickup truck, and in particular to a pickup truck bed for use therein which has one or more access doors mounted in the side thereof.

2. State of the Art

A utility vehicle, such as a pickup truck, can have an open bed in the back thereof. The open bed is usually oriented horizontally, such that the pickup truck user can place items thereon. The bed is surrounded, or otherwise defined at its perimeter edges, by vertically oriented walls, such that the items placed on the bed are prevented from slipping off or falling out of the bed by the walls on the perimeter thereof.

A tailgate, or pivoting door, is often placed in the vertical wall, or is the vertical wall itself, at the rear of the utility vehicle to provide access to the bed. The tailgate can pivot between a vertical position and a horizontal position about a hinge between the tailgate and the truck bed. Lowering the tailgate from its vertical position to its horizontal position oftentimes provides better access to the bed and facilitates the loading and unloading of objects into and out of the bed.

The bed and surrounding walls function together to define and serve as a cargo storage area and a means of transporting various items and objects placed in the bed. Indeed, since the inception of the pickup truck, the bed of the pickup truck has been used to transport a myriad of items and objects from place to place, as desired by the user. It follows that the item, or items, the user transports can be of any shape, size, dimension, profile, and configuration that fits within the bed. But, depending on the unique configuration of the object to be placed in the bed, the user may wish to place the object at a particular spot within the bed.

Factors that contribute to the selection of the object's placement include, for example, accessibility, convenience and safety. Many times the user will place lighter items that could possibly blow out of the bed in the front of the bed. Other times, the user will place items in the front of the bed so as to prevent the item from sliding in the bed during the process of applying the brakes to stop the truck. Sometimes, it isn't the user that decides where items ultimately end up in the bed, but is instead the object itself that moves in the bed during transport.

To reach items in the bed, the user must either climb over the walls of the bed or operate the tailgate and climb onto the bed from the rear of the truck. This can be a cumbersome process, and at the very least, inconvenient. What's more, the user could be towing a fifth wheel trailer or a bumper hitch trailer that makes it impossible to lower the tailgate to gain entry into the truck bed. Further, the item the user wishes to reach may be buried, or otherwise surrounded, by other items in the truck bed, forcing the user to climb over all of the items in the bed just to reach the desired item. This is especially true when the buried, desired item is near the front of the truck bed, away from the tailgate.

Additionally, the truck user may wish to transport passengers in the truck bed. However, to safely transport such passengers, the truck bed must provide required safety conditions. Also, to gain entrance into the truck bed, the passenger must necessarily climb over the vertical walls of the truck bed. Alternatively, the passengers can access the bed via the tailgate, but must nevertheless climb into the bed, and perhaps climb over any objects in the truck bed to reach any provided seating accommodations.

In view of the foregoing, there is a great necessity for a truck bed that addresses the problems presented above and makes pickup trucks more adept for today's growing needs and versatility of the user's preferences. Truck bed accessories and attachments are a huge market for adding different varieties of uses of a truck bed. The present disclosure addresses the aforementioned issues.

SUMMARY

The following relates to a utility vehicle such as a pickup truck, and in particular to a pickup truck bed for use therein which has one or more access doors mounted in the side thereof and accessory features that may be coupled to the truck bed and/or access door to provide advantageous benefits to the user.

A first general aspect relates to a pickup truck having a frame and a pickup bed mounted on the frame. The pickup bed has side walls and at least one access door positioned in a first side wall of the plurality of side walls. The access door may be configured to pivot between a closed positioned and an open position. The access door may further define an opening in the side wall, the opening being created by the access door being moved from the closed position in the side wall to the open position.

Another general aspect relates to the pickup truck having a cap member, the cap member being configured to releasably couple to the side walls of the pickup bed. The cap member may further comprise a gap in one side portion thereof, the gap being positioned above the opening, such that the gap and the opening correspond with one another and communicate with one another.

Another general aspect relates to the pickup truck having an extension body that can be engaged by the access door or that can releasably couple to the access door. The extension body may being configured to pivot with the access door between the open and closed positions and may further be configured to functionally engage the gap in the cap member under the condition that the access door is in the closed position.

Another general aspect relates to the pickup truck having a cap member that can be positioned over the truck bed and can engage the truck bed. The coupling of the cap member and the truck bed create a first space therebetween. Also, the cap member may further comprise a cavity in a side wall thereof, the cavity being configured with a size and shape of the size and shape of the extension body such that the cavity of the cap member functionally engages the extension body when the cap member is placed on the truck bed and effectively seals the cavity from the ingress of outside contaminants, such as air and water. Alternatively, the cavity can be configured to have a size and shape of the size and shape of the window positioned within the access door, such that when the window within the access door is deployed up out of the access door the window covers the cavity, engages the cavity, and effectively seals the cavity from the ingress of outside contaminants, such as air and water. The cap member can be a full-size cap member the covers the entire truck bed, or alternatively, the cap member can be a smaller size to permit additional storage behind the smaller cap member and yet within the truck bed.

Another general aspect relates to the pickup truck having the first space under the cap member and between the cap member and the truck bed effectively sealed from outside contaminants. This provides that the truck bed may house additional passenger seating, the passenger seating being removable, as desired.

Another general aspect relates to the pickup truck having a complimentary tonneau cover that compliments the size of the cap member. The complimentary tonneau can be configured to cover the remaining space in the truck bed that is not occupied by the smaller-size cap member. In this way, the complimentary tonneau creates a second space behind the first space created within the cap member and the truck bed.

Another general aspect relates to the pickup truck having a full-size tonneau cover that covers the entire truck bed. Nevertheless, the full-size tonneau cover has front lids and a rear lid that compliment the access door and the rear tailgate, respectively. In other words, the front lids are configured to correspond to and compliment the use and functionality of the access door, whereas the rear lid is configured to correspond to and complement the functionality of the tailgate.

Another general aspect relates to the utility vehicle comprising a truck bed, the truck bed having side walls on opposing sides thereof that extend substantially orthogonally from the truck bed, an access door positioned in one side wall of the opposing side walls, the access door being configured to pivot with respect to the sidewall between a closed position and an open position, an opening defined in the side wall, the opening being exposed under the condition that the access door is moved to the open position and the opening being closed under the condition that the access door is moved to the closed position, a cap member, the cap member being configured to releasably couple to the truck bed, the cap member having a cavity in a side thereof, the cavity being positioned above the opening and in functional communication with the opening under the condition the access door is in the open position.

Another general aspect relates to the extension body configured to functionally couple to the access door, the extension body moving in unison with the access door between the open and closed positions and configured to functionally engage the cavity in the cap member under the condition that the access door is in the closed position.

Another general aspect relates to wherein a lower portion of the extension body is configured to repeatedly and releasably couple to a top portion of the access door.

Another general aspect relates to wherein the opening and the cavity being in communication with one another provides passenger access to the truck bed.

Another general aspect relates to wherein the truck bed further comprises a tailgate in an end portion thereof between the opposing side walls.

Another general aspect relates to wherein the extension body further comprises a central opening defined by the extension body.

Another general aspect relates to wherein the central opening is occupied by a transparent material.

Another general aspect relates to wherein the functional engagement between the extension member and the cavity defined in the cap member prevents the ingress of contaminants through the cavity.

Another general aspect relates to a first space, the first space being defined between the cap member and the truck bed under the condition the cap member is coupled to the truck bed.

Another general aspect relates to removable seating configured to releasably couple to the truck bed and being positioned in the first space under the cap member.

Another general aspect relates to a roll bar, the roll bar being integral to the cap member and configured to protect the first space.

Another general aspect relates to a roll bar configured to releasably couple to the truck bed and configured to protect the first space, the roll bar being positioned around the removable seating and under the cap member.

Another general aspect relates to wherein the cap member has a length less than a length of the truck bed, such that the cap member is shorter than the truck bed.

Another general aspect relates to a panel, the panel being configured to releasably couple between a back end of the short cap member a bed surface of the truck bed, thus dividing the truck bed into a first space and a second space, the first space being configured for passenger transport and the second space being configured for storage.

Another general aspect relates to a cover, the cover being configured to releasably couple to the truck bed behind the cap member to conceal the second space.

Another general aspect relates to a utility vehicle comprising a truck bed, the truck bed having side walls on opposing sides thereof that extend substantially orthogonally from the truck bed, an access door positioned in one side wall of the opposing side walls, the access door being configured to pivot with respect to the sidewall between a closed position and an open position, an opening defined in the side wall, the opening being exposed under the condition that the access door is moved to the open position and the opening being concealed under the condition that the access door is moved to the closed position, a cover, the cover being configured to releasably couple to the truck bed, the cover being configured to conceal the interior of the truck bed, the cover having a hinged lid therein, the hinged lid being in communication with the opening.

Another general aspect relates to wherein the cover is substantially parallel with the truck bed surface.

Another general aspect relates to wherein the cover comprises a plurality of hinged lids, the hinged lids being configured to transition between an open position and a closed position.

Another general aspect relates to a plurality of access doors and a plurality of hinged lids, wherein each of the plurality of hinged lids communicates with a respective access door, such that in the open position the opening in the side wall and the open hinged lid provides access to the truck bed.

Another general aspect relates to a hinged lid that is configured to communicate with a tailgate of the vehicle, the tailgate being configured to transition between an open and a closed position.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
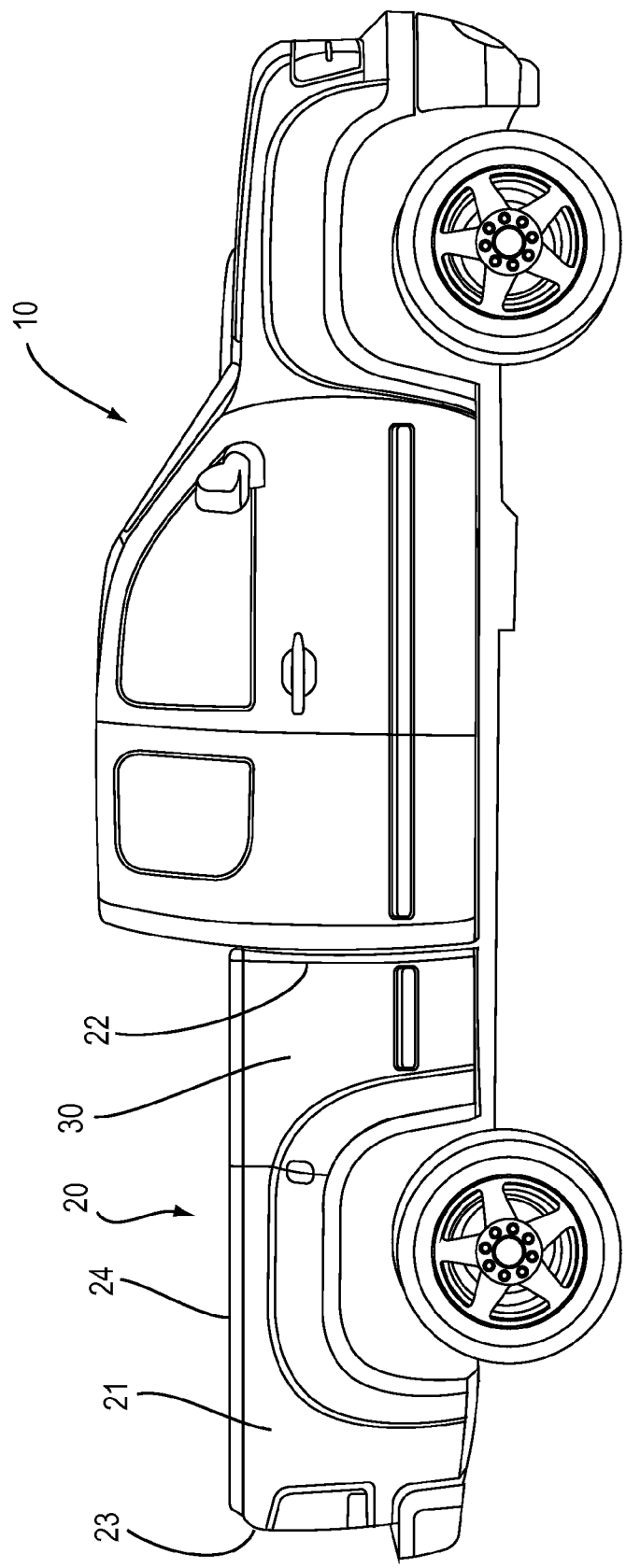
FIG. 1 is a side view of an embodiment of a utility truck in accordance with the present disclosure.

Referring to the drawings, FIG. 1 depicts embodiments of a conventional utility vehicle 10, or pickup truck 10, having a truck bed 20. The truck bed 20 may sit on the rigid frame of the truck 10, the rigid frame being made of metal or other rigid material known in the art. Embodiments of the truck 10 may comprise the truck bed 20 having a front end 22 and a rear end 23, wherein two opposing vertical side walls 21 run substantially orthogonal between the front end 22 and the rear end 23. One of the vertical side walls 21 is visible in FIG. 1, the opposing vertical side wall 21 being positioned on an opposing side of the truck bed 20. A horizontal surface 12, or bed surface 12, of the truck 10 is defined between the opposing vertical side walls 21 and front end 22 and rear end 23. The truck bed 20 may further comprise a top edge 24 on each of its vertical side walls 21 and its front and rear ends 22 and 23.

Figure 2:
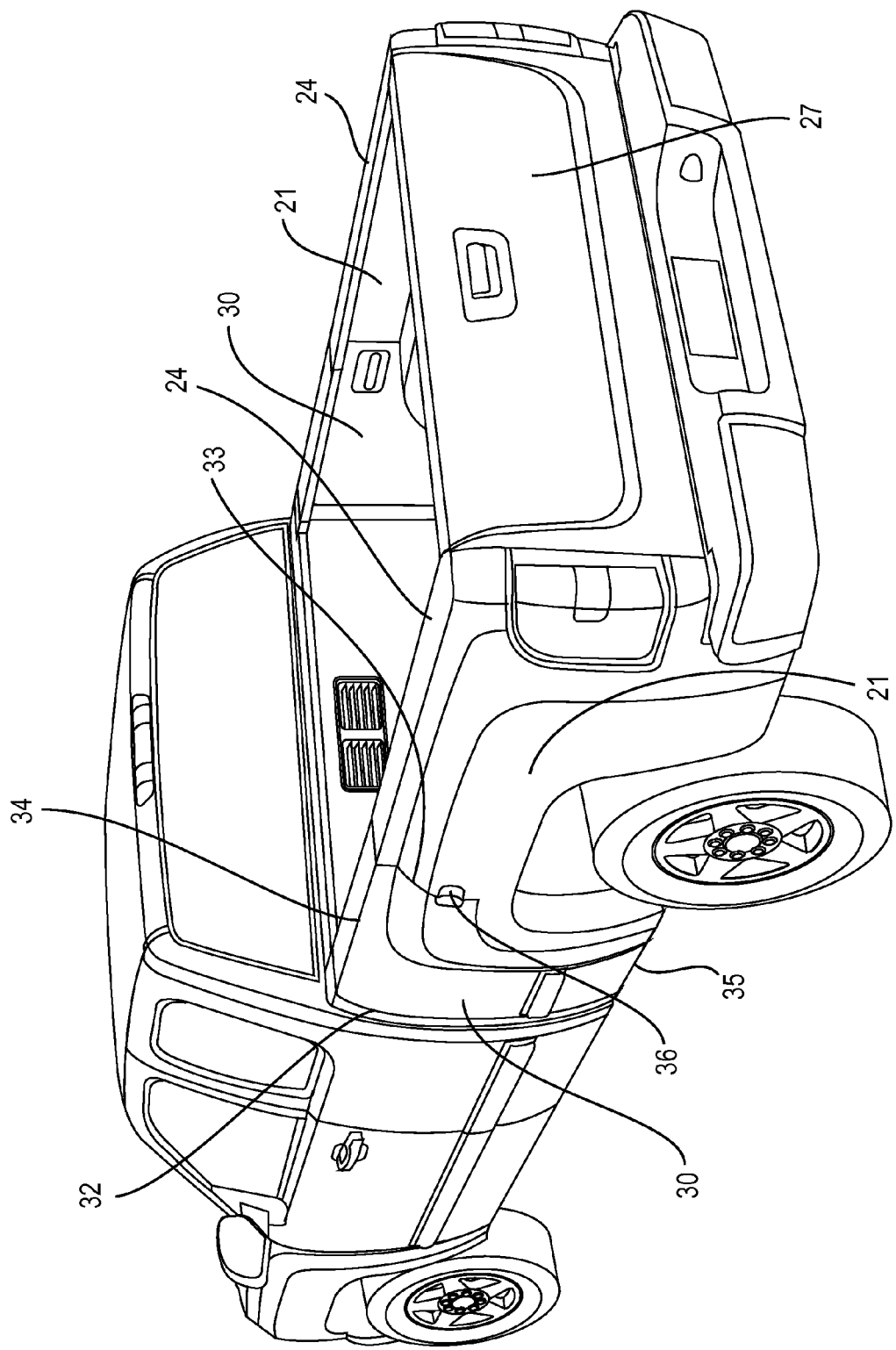
FIG. 2 is a side perspective view of an embodiment of the utility truck in accordance with the present disclosure.

Referring to FIG. 2, embodiments of the utility vehicle 10, or pickup truck 10, may further comprise a tailgate 27 being configured in the rear end 23 of the truck bed 20. Embodiments of the pickup truck 10 may further comprise the truck bed 20 having an access door 30 positioned in one or more side walls 21 of the truck bed 20. The access door 30 may have a front end 32, a rear end 33, a top edge 34, and a bottom edge 35. The access door 30 may further comprise a handle 36 that is configured to operate the access door 30 to enable the access door 30 to pivot between an open position and a closed position, an embodiment of the closed position being depicted in FIG. 2 and an embodiment of the open position being depicted in FIG. 3.

Referring still to FIG. 2, with the access door 30 in the closed position, the access door 30 may fit within a frame defined in the side wall 21, such that the top edge 34 of the access door 30 is substantially co-planar with the top edge 24 of the side wall 21, and the outer surface of the access door 30 and the outer surface of the side wall 21 are substantially flush with one another and comprise the integral vertical side wall 21 of the truck bed 20. Further, in the closed position, the access door 30 may be configured to be functionally coupled to the truck bed 20, and in particular to the side wall 21 in which the access door 30 is positioned. The access door 30 may be configured to repeatedly release a portion thereof from the side wall 21 upon operation of the handle 36 to permit the access door 30 to pivot between the closed position and the open position.

Figure 3:
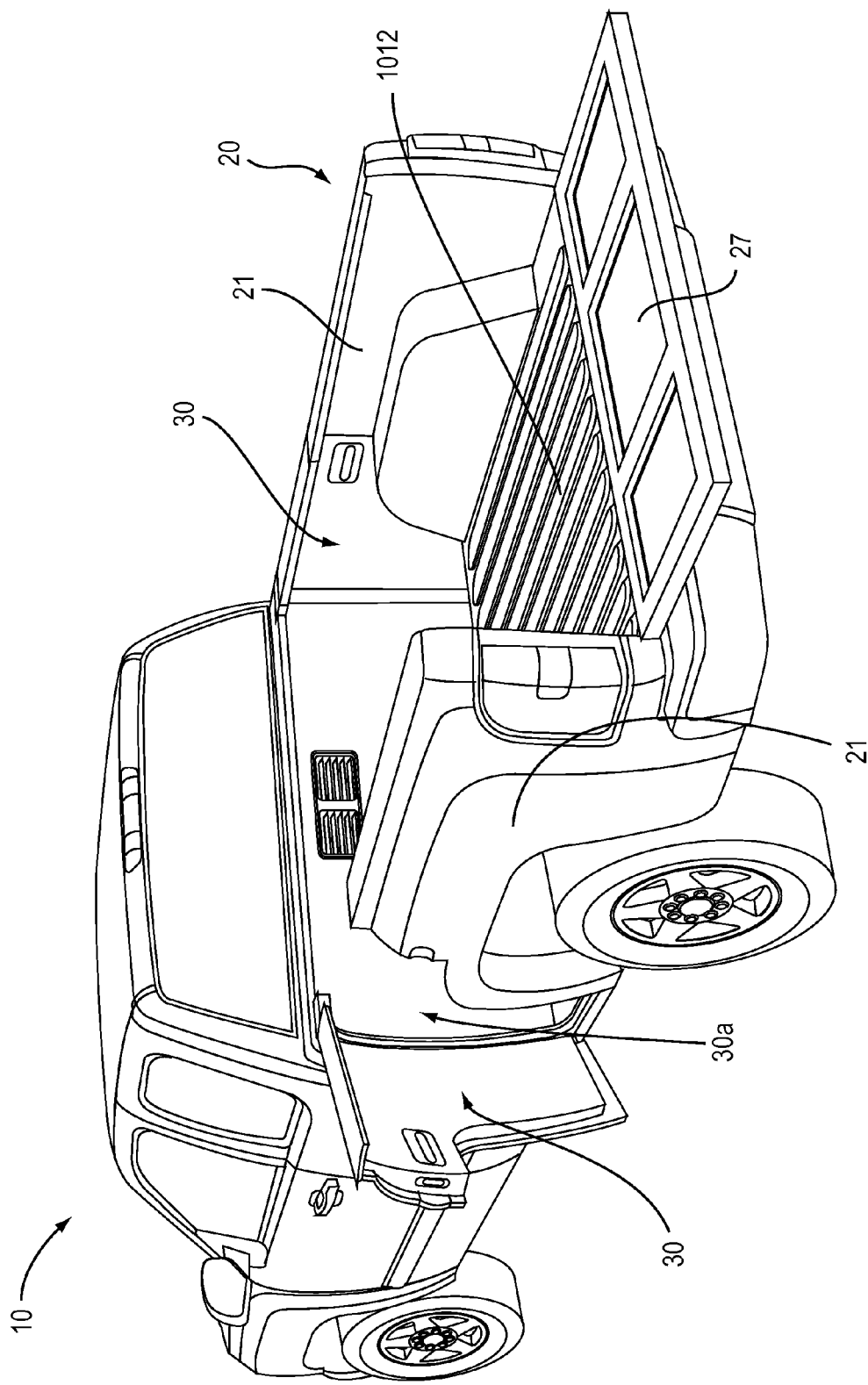
FIG. 3 is a side perspective view of an embodiment of the utility truck in accordance with the present disclosure.

As depicted in FIG. 3, with the access door 30 in the open position, the absence of the access door 30 in the side wall 21 defines an opening 30a in the side wall 21. The opening 30a in the side wall 21 may provide access to the truck bed 20 through the side wall 21 and to the contents contained in the truck bed 20. The user may then utilize the opening 30a to reach into the truck bed 20 and remove items therefrom or place items therein. The user may also utilize the opening 30a to gain easier entrance into the truck bed 20.

Embodiments of the truck 10 comprise the access door 30 being configured to pivot about a coupling means, such as a hinge, functionally positioned between the front end 32 and the truck bed 20, and in particular, between the front end 32 and the side wall 21 of the truck bed 20. Alternative embodiments of the truck 10 comprise the access door 30 being configured to pivot about the coupling means functionally positioned between the bottom edge 35 and the truck bed 20, and in particular, between the bottom edge 35 and the side wall 21 of the truck bed 20. Alternative embodiments of the truck 10 comprise the access door 30 being configured to pivot about the coupling means functionally positioned between the top edge 34 and the truck bed 20, and in particular, between the top edge 34 and the side wall 21 of the truck bed 20. Alternative embodiments of the truck 10 comprise the access door 30 being configured to pivot about the coupling means functionally positioned between the rear end 33 and the truck bed 20, and in particular, between the rear end 33 and the side wall 21 of the truck bed 20.

Embodiments of the truck 10 include the access door 30 being configured to repeatedly pivot from the closed position to the open position or between the closed position and the open position, upon engagement of the handle 26, as desired by the user, to permit the user to repeatedly access the interior of the truck bed 20 through the opening 30a defined in the side wall 21 when the access door 30 is in the open position. Embodiments of the truck 10 further comprise the access door 30 having a step, stage, platform, stair, ridge, or surface that is positioned on the interior surface thereof, or a step, stage, platform, stair, ridge, or surface that is positioned and configured within the opening 30a in the side wall 21 created by the access door 30 being opened, that may be utilized by the user to support the weight of the user as the user attempts to gain access into the truck bed 20. The user may place his/her body part of choice on the step and propel himself/ herself into the truck bed 20.

Embodiments of the truck 10 further comprise the access door 30 having a transparent material, such as glass or plexiglass, positioned within the access door 30, or in other words, within an interior space of the access door 30 defined between its exterior and interior surfaces. Embodiments of the truck 10 further comprise the access door 30 having no such transparent material inside the access door 30. In embodiments of the truck 10 that comprise the transparent material within the interior space of the access door 30, the transparent material may be secured to the access door 30 within the interior space, but may be configured to move out of and retract back into the interior space, as desired by the user. Specifically, the transparent material may be in a stored position within the interior space of the access door 30 and may be deployed from within the interior space of the access door 30 by the user activating a mechanism to cause the transparent material to rise up through a hollow slot in the top edge 34 of the access door 30. The transparent material may be configured to rise up a predetermined distance above the top edge 34 and stop, thus restricting the upward movement of the transparent material. The transparent material within the access door 30 may be as wide as the width of the access door 30, but may alternatively be any width not larger than the width of the access door 30. The transparent material may function as a window when in the deployed position.

Figure 4:
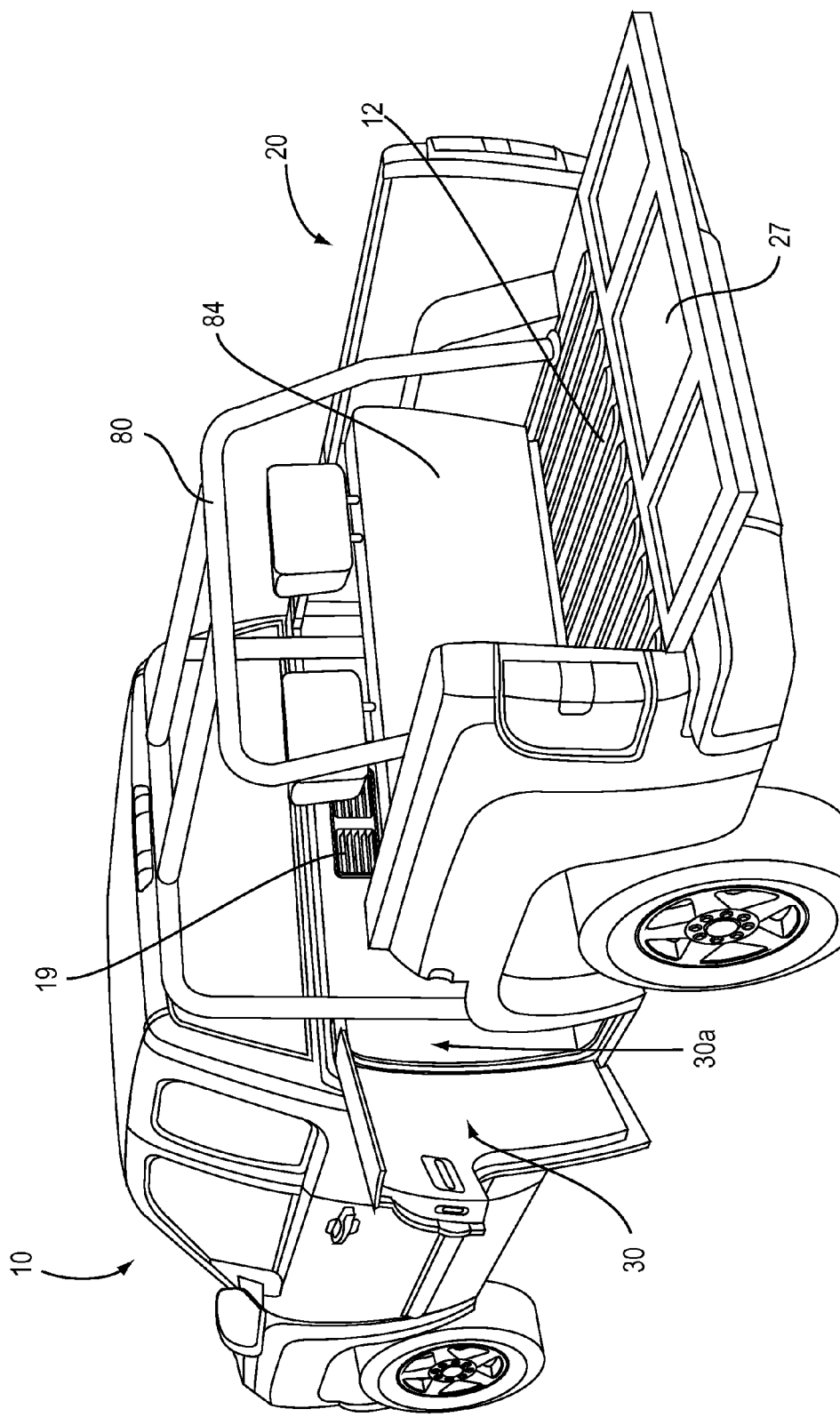
FIG. 4 is a side perspective view of an embodiment of the utility truck in accordance with the present disclosure.

As depicted in FIG. 4, embodiments of the truck 10 may further comprise the truck bed 20 being configured to receive a roll bar 80, removable seating 84, or both. The roll bar 80 may be configured to be repeatedly and releasably coupled to the truck bed 20, such as on the sidewalls 21 or the bed surface 12, by fasteners, such as bolts, pins, releasable clips, latches, clasps, or other user-operated fastening means that rigidly secure the roll bar 80 to the truck bed 20 during use and also permit the user to remove the roll bar 80 from the truck bed 20, as needed, when not in use. The removable seating 84 may be configured to be repeatedly and releasably coupled to the truck bed 20, such as on the sidewalls 21 or the bed surface 12, such that the removable seating 84 is positioned within the truck bed 20 so as to permit a user to sit on the removable seating 84 and have ample leg room between the removable seating 84 and the front end 22 of the truck bed 20. With the removable seating 84 coupled to the truck bed 20, a user may enter the truck bed 20 via the access door 30. Specifically, the user may operate the handle 36 to open the access door 30 to expose the opening 30a through which the user may gain easy access to the interior of the truck bed 20 to sit on the removable seating 84. Embodiments of the truck 10 may further comprise the roll bar 80 being coupled to the truck bed 20 and being configured so as to functionally protect the removable seating 84 and any user that may be seated therein. In other words, the roll bar 80 may be structured to protect the occupants of the removable seating 84 in the event the truck 10 rolls or tips over. With the roll bar 80 and the removable seating 84 in place within the truck bed 20, the user may operate the handle 36 to open the access door 30 to expose the opening 30a through which the user may gain easy access to the interior of the truck bed 20 to sit on the removable seating 84 under the protection of the roll bar 80. Embodiments of the truck 10 may further comprise the access door 30 being positioned in the truck bed 20 in one or more sidewalls 21.

As further depicted in FIG. 4, the truck bed 20 may further comprise one or more vents 19 that place the interior space of the truck bed 20 in fluidic communication with the air conditioning system 17 and the heating system 18 of the truck 10. The vents 19 may be further configured to direct the treated air from the air conditioning or heating systems, 17 and 18, of the truck 10 into the interior space of the truck bed 20 to control the temperature of the interior space of the truck bed 20. The vent 19 may be configured in the front end 22 of the truck bed 20, the sidewalls 21 of the truck bed, the access door 30, or in any combination of these.

Figure 5:
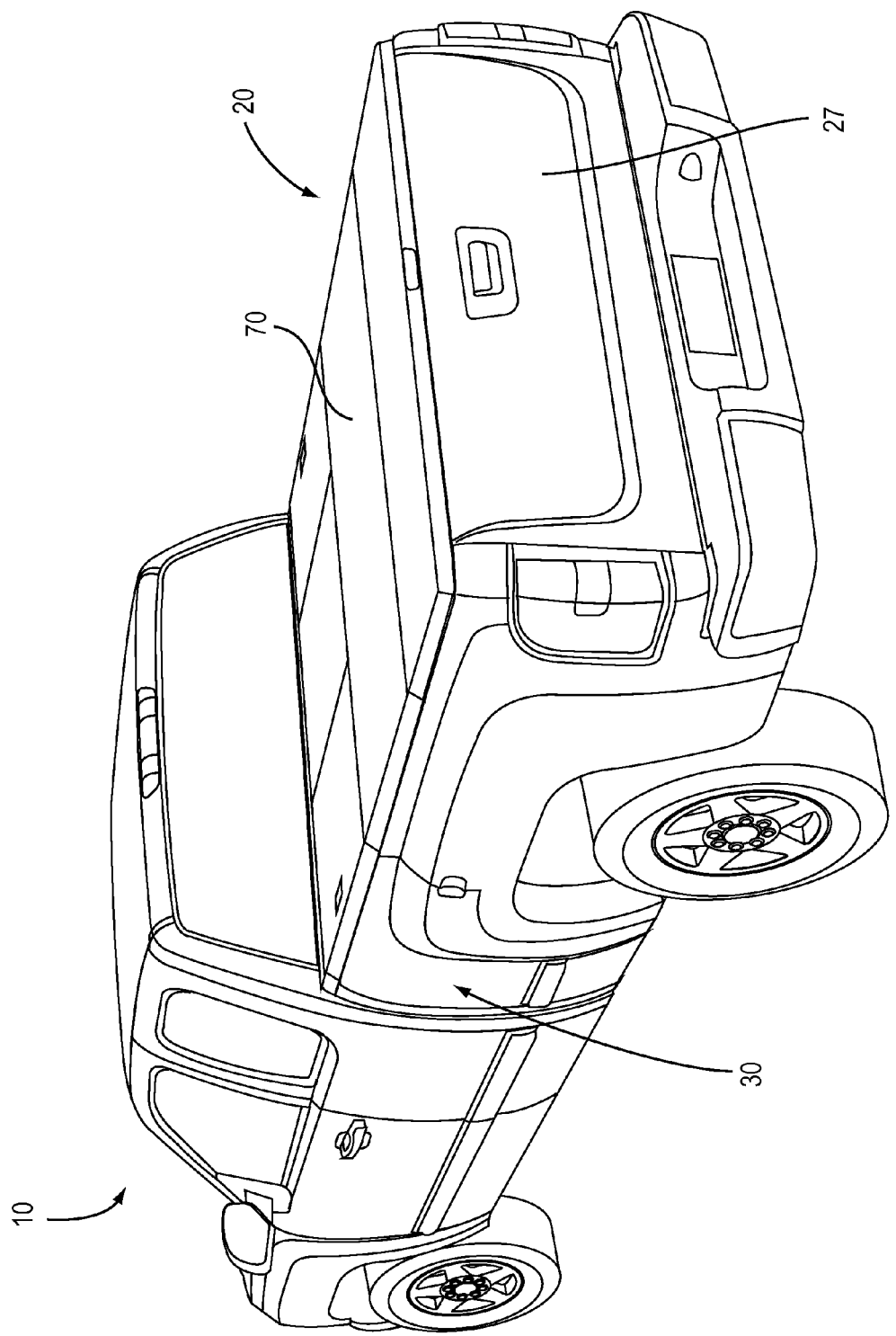
FIG. 5 is a side perspective view of an embodiment of the utility truck in accordance with the present disclosure.
Figure 6:
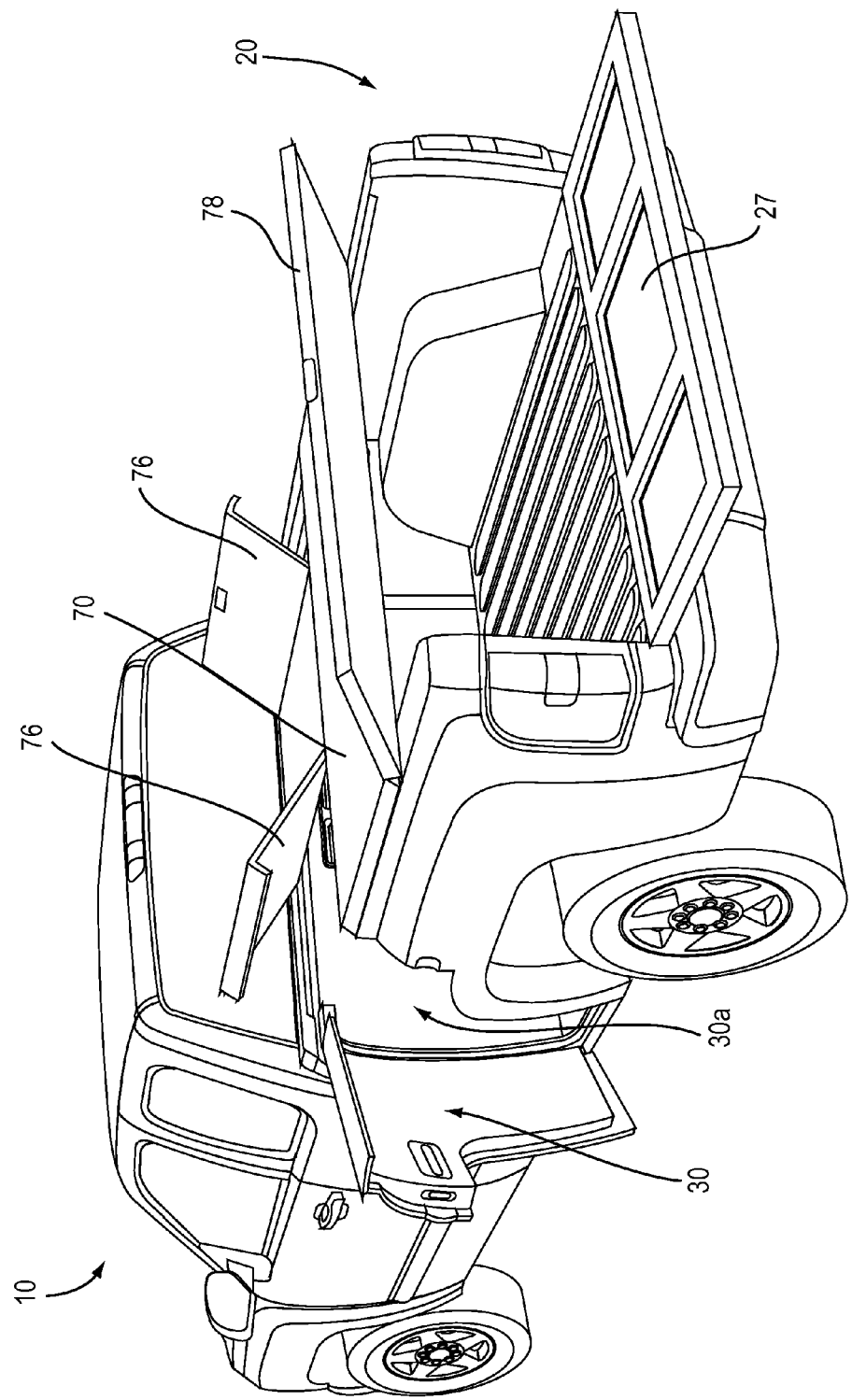
FIG. 6 is a side perspective view of an embodiment of the utility truck in accordance with the present disclosure.

Referring now to FIGS. 5 and 6, embodiments of the truck 10 may further comprise a truck bed cover 70. The cover 70 may be a full-size tonneau cover that covers the entire truck bed 20 from sidewall 21 to sidewall 21, as well as from front end 22 to back end 23. Embodiments of the truck 10 may further comprise the cover 70 being configured to correspond to the features of the access door 30. For example, the cover 70 may further comprise front lids 76 that are positioned in the cover 70 to correspond to the access door 30, as depicted in FIG. 6. The front lids 76 may be configured to lift or rise up from the cover 70, in a pivoting manner, as depicted in FIG. 6, or in a completely releasable manner, or a combination of both, to expose the interior truck bed 20, even with the cover 70 coupled to the top of the truck bed 20 and the access door 30 being in the closed position. In this way, the user may lift the front lid 76, as needed, to reach down into the truck bed 20 to retrieve items and objects therein. Also, the access door 30 may be operated to open independently of the front lid 76, such that a user may access the interior space of the truck bed 20 without having to operate the front lid 76. Alternatively, as depicted in FIG. 6, the user may open the front lid 76 as well as open the access door 30 to gain easier and more convenient access into the interior of the truck bed 20. Each of the front lids 76 may be configured to be locked in the closed position, as depicted in FIG. 5, to prevent access into the interior space of the truck bed 20.

Referring still to FIGS. 5 and 6, embodiments of the truck 10 may further comprise a back lid 78 that may function in a similar manner to the front lid 76, except the back lid 78 may communicate with the rear end 23 of the truck bed 20, such as the tailgate 27. The back lid 78 may be configured to lift or rise up from the cover 70, in a pivoting manner, as depicted in FIG. 6, or in a completely releasable manner, or a combination of both, to expose the interior of the truck bed 20, even with the cover 70 coupled to the top of the truck bed 20 and the rear end 23 (e.g., the tailgate 27) in the closed position. In this way, the user may lift the back lid 78, as needed, to reach down into the truck bed 20 to retrieve items and objects therein. Also, the tailgate 27 may be operated to open independently of the back lid 78, such that a user may access the interior space of the truck bed 20 without having to operate the back lid 78. Alternatively, as depicted in FIG. 6, the user may open the back lid 78 as well as open the rear end 23, including the tailgate 27, to gain easier and more convenient access into the interior of the truck bed 20. The back lid 78 may be configured to be locked when in the closed position, as depicted in FIG. 5, to prevent access into the interior space of the truck bed 20.

Figure 16:
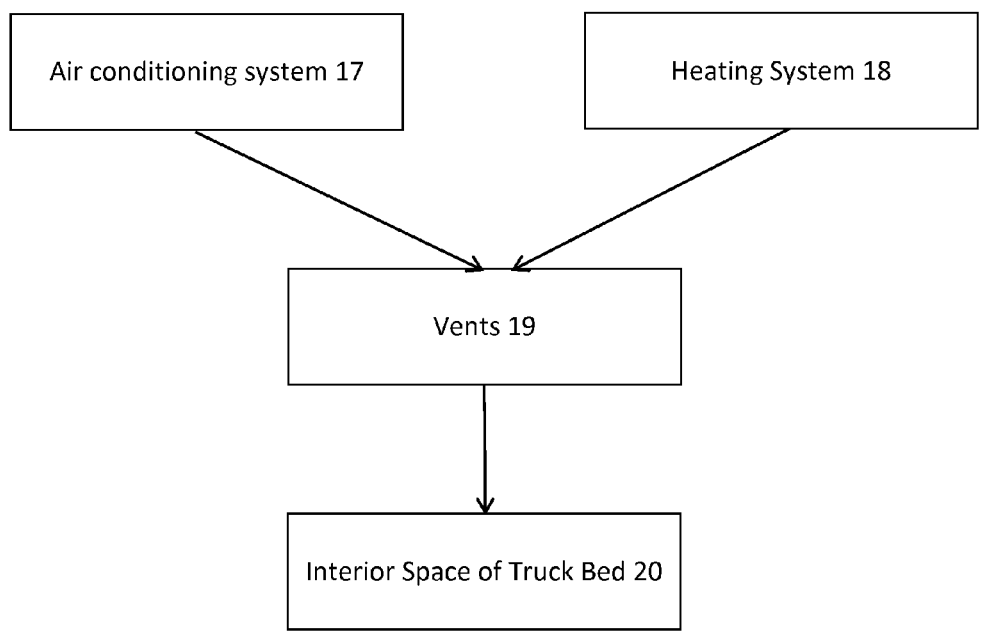
FIG. 16 is a schematic view of components of an embodiment of the utility truck in accordance with the present disclosure.

With the cover 70 in the closed position, the user of the truck 10 may control the temperature of the interior space of the truck bed 20 via the vents 19 and the air conditioning and heating systems, 17 and 18, in communication therewith, as schematically depicted in FIG. 16.

Figure 7:
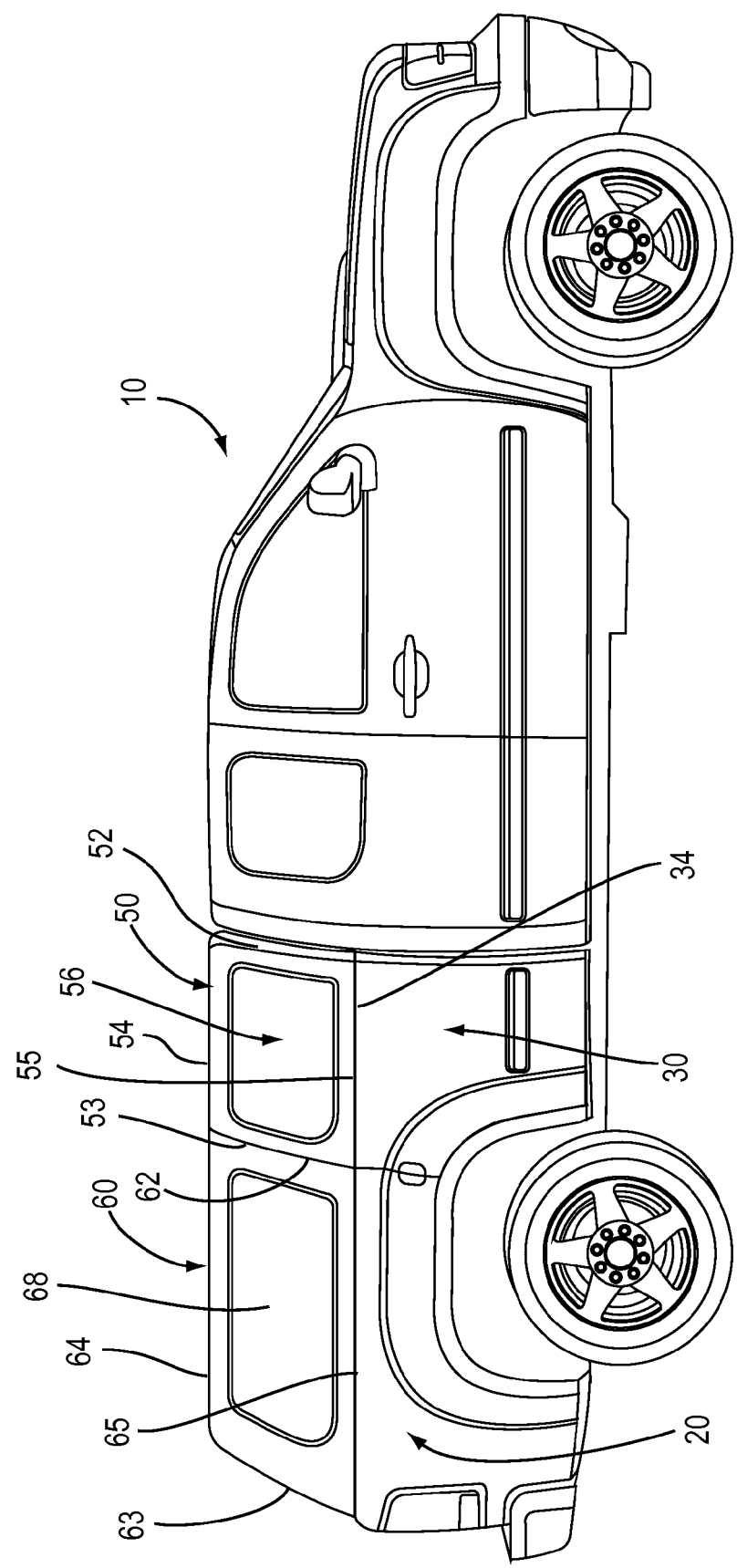
FIG. 7 is a side view of an embodiment of the utility truck in accordance with the present disclosure.
Figure 8:
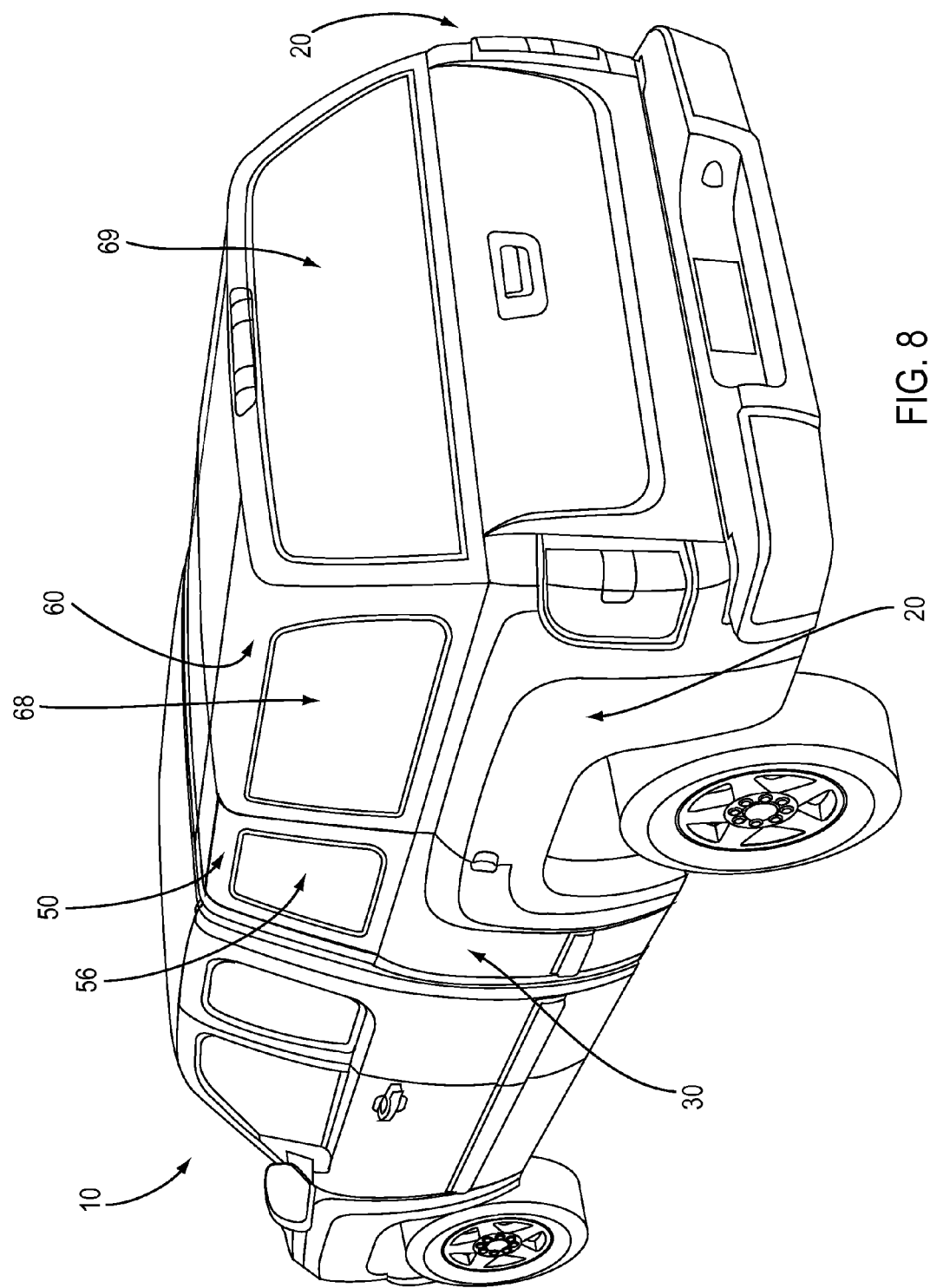
FIG. 8 is a side perspective view of an embodiment of the utility truck in accordance with the present disclosure.
Figure 9:
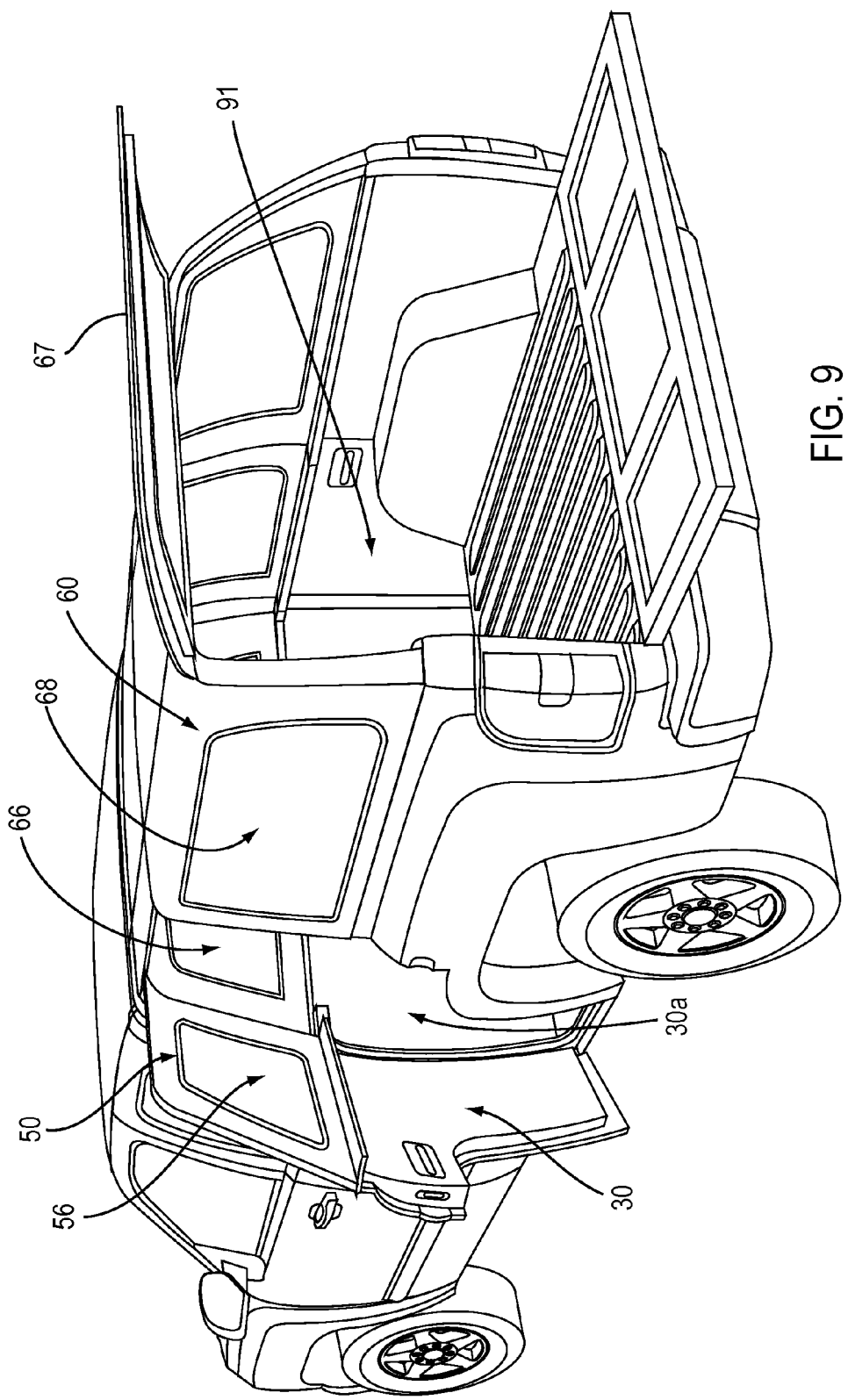
FIG. 9 is a side perspective view of an embodiment of the utility truck in accordance with the present disclosure.

Referring to FIGS. 7-9, embodiments of the truck 10 may further comprise an extension body 50 and a cap member 60. Embodiments of the extension body 50 may comprise the extension body 50 having a front end 52, a rear end 53, a top end 54, and a bottom end 55, as shown in FIG. 7. Embodiments of the extension body 50 may include the extension body 50 being a solid piece. Embodiments of the extension body 50 may include the extension body 50 being comprised of metals, plastics, fiberglass, or other like materials, the metals, plastics, fiberglass and materials being configured with the properties and characteristics to satisfy the safety and operational requirements of passenger vehicles.

Embodiments of the truck 10 include the extension body 50 having a central aperture 56 defined by and within the external border of the extension body 50, the external border being comprised of the front end 52, the rear end 53, the top end 54, and the bottom end 55. Embodiments of the truck 10 include the central aperture 56 being hollow, or otherwise open, such that line of sight is not obstructed through the central aperture 56 and objects may be passed through the central aperture 56, if needed.

However, alternative embodiments of the truck 10 may include, as shown, the central aperture 56 having inserted therein a transparent material, such as glass, plexiglass, or other like material, the transparent material functioning as a window. Embodiments of the truck 10 may include the transparent material being rigidly fixed within the central aperture 56. Embodiments of the truck 10 may include the transparent material being configured to open within the central aperture 56. For example, but not in a limiting way, the transparent material may be configured to pivot within the central aperture 56 to open the window. Embodiments of the truck 10 include the transparent material being configured to be detached and removed completely out of the central aperture 56. Embodiments of the truck 10 include the transparent material pivoting only a predetermined distance with respect to the central aperture 56, such that the transparent material can only create a predetermined-sized opening in the central aperture 56. Further in example, but not in a limiting sense, the transparent material within the central aperture 56 can retract out of the central aperture 56 so that the transparent material is completely removed from the central aperture 56. This can be accomplished, for example, by decoupling the transparent material from the extension body 50, so that the central aperture 56 is hollow, or otherwise open.

Embodiments of the truck 10 may include the extension body 50 being configured to releasably and repeatedly couple to the access door 30. For example, the bottom end 55 of the extension body 50 and the top edge 34 of the access door 30 can be configured with corresponding mating mechanisms that permit the bottom end 55 of the extension body 50 to releasably and repeatedly couple to the top edge 34 of the access door 30 to secure the extension body 50 to the access door 30, such that the extension body 50 moves with the pivoting movement of the access door 30. Accordingly, once properly coupled, the access door 30 and the extension body 50 function as a unitary body, with the extension body 50 pivoting with the access door 30 between its open and closed positions.

As desired by the user, the extension body 50 may be configured to move from its upright state above the access door 30. For example, and not in any way limiting, embodiments of the truck 10 may include the extension body 50 being decoupled and completely removed from the access door 30. Embodiments of the truck 10 may include the extension body 50 being configured to pivot about the corresponding mating mechanisms, which hold the extension body 50 to the access door 30. Such pivoting allows the extension body 50 to be structurally configured to pivot down into the truck bed 20 and out of view. In this way, the extension body 50 remains coupled to the access door 30, but yet, at the same time, is stored away in the bed 20 of the truck 10 and thus concealed from view. In this pivoting configuration, the extension body 50 further comprises a locking mechanism that locks the extension body 50 in the stored position and in the upright position.

In embodiments of the truck 10 where the access door 30 contains the transparent material therein and the extension body 50 is coupled to the access door 30, as described in detail above, the extension body 50 has no need of its own separate transparent material in the central aperture 56. Indeed, when the access door 30 is configured to permit its transparent material to rise up out of the interior space of the access door 30 through the slot in the top edge 34, the transparent material may also rise up through a slot in the bottom end 55 of the extension body 50 and enter the central aperture 56. The slot in the top edge 34 and the slot in the bottom edge 55 are structured to correspond with one another and functionally communicate with one another to permit the transparent material to transition therethrough without undue resistance or hindrance. As the transparent material moves up through the slots and enters the central opening 56, the transparent material engages and slides within grooves on the interior surfaces of the front and rear ends 52 and 53, respectively, until the transparent material rises up to and abuts a groove on the interior surface of the top end 54 of the extension body 50. Once the transparent material engages the groove on the interior surface of the top end 54, the transparent material comes to a rest and is secured within the central opening 56 so as not to move. In this way, the transparent material in the access door 30 can rise up into the central aperture 56 of the extension body 50 and close the central aperture 56. The transparent material thus effectively seals the central aperture 56 from the ingress of air, wind, rain, and other elements. Thereafter, as desired by the user, the transparent material can be retracted out of the central aperture 56, in much the same way it was inserted, and can be stored within the interior space of the access door 30, until it is needed again. A mechanically- or electrically-driven rising mechanism, operated by the user, can control the lifting and lowering of the transparent material from within the access door 30.

With continued reference to FIGS. 7-9, embodiments of the truck 10 may further comprise a cap member 60. The cap member 60 may comprise a front end 62, a rear end 63, a top end 64, and a bottom end 65. The cap member 60 may have a sidewall aperture 68 defined in the sidewall of the cap member and within the external border of the cap member 60, the external border being comprised of the front end 62, the rear end 63, the top end 64, and the bottom end 65. The cap member 60 may have a back wall aperture 69 defined in the back wall of the cap member 60 and within the external border of the cap member 60. Embodiments of the truck 10 may include the central aperture 68 and/or the back wall aperture 69 being hollow, or otherwise open, such that line of sight is not obstructed through the central or back wall apertures 68 and 69 and objects may be passed through the apertures 68 and 69, if needed. The cap member 60 may be further comprised of metals, plastics, fiberglass, or other like materials, the metals, plastics, fiberglass and materials being configured with the properties and characteristics to satisfy the safety and operational requirements of passenger vehicles and truck caps. The cap member 60 may also have defined within the central aperture 68 a transparent material, such as glass, that functions as a window. The window may prop open or may be completely removed from the cap member 60, in much the same way the transparent material of the extension body 50 is secured within the central aperture 56 and operates with respect to the extension body 50. Alternatively, the transparent material in the cap member 60 may be fixed within the cap member 60.

Embodiments of the truck 10 may further comprise the cap member 60 being configured to be placed over the truck bed 20 and to secure to the truck bed 20, such as to secure to the top edges 24 of the truck bed 20, such that the cap member 60 may define a first space 91 under the cap member 60 and between bed surface 12 of the truck bed 20 under the cap member 60. The rear end 63 of the cap member 60 may be configured to correspond to and contact the rear end 23 of the truck bed 20. Likewise, the front end 62 of the cap member 60 may be configured to correspond to and contact the front end 22 of the truck bed 20. The front end 62 may also be configured to releasably and repeatedly couple to the front end 22, as desired by the user, whereas the rear end 63 may not necessarily couple to the rear end 23 to provide for the opening and closing of the tailgate 27 independently of the cap member 60. The vertical side walls of the cap member 60 may be configured to correspond to and contact the vertical side walls 21 of the truck bed 20. Moreover, the vertical side walls of the cap member 60 may be configured to releasably and repeatedly couple to the vertical side walls 21 of the truck bed 20, as desired by the user. In this way, the cap member 60 can be secured to the truck bed 20 so that the first space 91 is defined therebetween.

Embodiments of the truck 10 may further comprise the cap member 60 further comprising a cavity 66, the cavity 66 being defined in a vertical side wall of the cap member 60 above the access door 30. Embodiments of the truck 10 include the cavity 66 being configured of a size and shape to correspond to the size and shape of the extension body 50 and to functionally engage the extension body 50. In this configuration, the cavity 66 and the extension body 50 can releasably and repeatedly functionally couple together, as desired by the user. Indeed, the cavity 66 and the extension body 50 may be configured to structurally correspond to one another to effectively seal the cavity 66 from the ingress of air, wind, water, rain, and other like elements into the cavity 66 under the condition that the extension body 50 and the access door 30 are in the closed position. Also in this configuration, under the condition that the cap member 60 is secured to the truck bed 20, the user may operate the handle 36 of the access door 30 to pivot the access door 30 from its closed position to its open position. In so doing, the extension body 50, which is coupled to the access door 30, as described herein, also pivots with the access door 30 from the closed position to the open position. Accordingly, in the open position, the access door 30 and the extension body 50 reveal an entrance, comprised of the opening 30*a* and the cavity 66, to the interior of the first space 91 defined by the cap member 60 and the truck bed 20 and through which the user may enter, or otherwise access, the first space 91.

Embodiments of the truck 10 may further comprise the cavity 66 being configured of a size and shape to correspond to the size and shape of the transparent material housed within the interior of the access door 30. In this configuration, the cavity 66 and the transparent member (i.e., window) stored in the interior of the access door 30 may be configured to structurally correspond to one another and to functionally engage one another. That is, the transparent member may be configured to deploy out of the access door 30 through the slot in the top edge 34 and engage the cavity 66 to effectively seal the cavity 66 from the ingress of air, wind, water, rain, and other like elements into the cavity when the transparent member is in the deployed position. The cavity 66 is likewise structurally configured with grooves on its inner surfaces to receive and engage the transparent material when the transparent material is deployed in the cavity 66. Additionally, a flexible material, like rubber, may be placed in, around, or near the grooves to engage the transparent material and function as a gasket to effectively seal the cavity 66. It follows that in this configuration, the extension body 50 may be the transparent material that is configured in the access door 30, because the transparent material in the access door 30 functionally engages and covers the cavity 66. Thus, similarly to that described above, when the cap member 60 is secured to the truck bed 20, the user may operate the handle 36 of the access door 30 to pivot the access door 30 from its closed position to its open position. In so doing, the transparent material that is deployed in the cavity 66 also pivots with the access door 30 from the closed position to the open position. Accordingly, in the open position, the access door 30 and the deployed transparent material reveal an entrance in the side wall 21 of the truck bed 20 and the cap member 60, respectively, that exposes a portion of the interior of the first space 91 defined by the cap member 60 and the truck bed 20 and through which the user may access the first space 91.

Embodiments of the truck 10 further comprise the removable seating 84 being configured on the truck bed 20 within the interior of the first space 91 defined between the cap member 60 and the bed surface 12. The removable seating 84 may be coupled to the truck bed 20 under the cap member 60, such that the cap member 60 encloses the removable seating 84 within the interior first space 91. In this way, with the cap member 60 covering the removable seating 84, the access door 30 and the extension member 50 may provide convenient entrance for any passengers into the first space 91 for the passengers to utilize the removable seating 84. Accordingly, the removable seating 84 may be coupled to the truck bed 20 to provide extra seating for passengers, as needed. The removable seating 84 may also be configured with safety restraints and other necessary safety features that satisfy the rules and regulations that govern the safety of passengers within vehicles. In addition to the foregoing, embodiments of the truck 10 may further comprise the cap member 60 being configured with the roll bar 80 that is integral to the cap member 60, such that under the condition the cap member 60 is functionally coupled to the truck bed 20, the roll bar 80 is also naturally positioned over the removable seating 84 to protect the passengers sitting in the removable seating 84 positioned within the first space 91. Alternatively, the removable seating 84 may be configured with the roll bar 80 integral to the removable seating 84, the roll bar 80 functioning to protect the passengers sitting in the removable seating 84 positioned within the first space 91. As further depicted in FIGS. 8 and 9, the rear end 63 of the cap member may have configured therein a lift gate 67 that may pivot between closed and open positions, the closed position being depicted in FIG. 8 and the open position being depicted in FIG. 9.

With the extension member 50 and the cap member 60 in functional communication with the access door 30 and the truck bed 20, respectively, the user of the truck 10 may control the temperature of the interior space of the truck bed 20 under the cap member 60 via the vents 19 and the air conditioning and heating systems, 17 and 18, in communication therewith, as schematically depicted in FIG. 16. In addition, under the condition that the cap member 60 is coupled to the truck bed 20 to create the first space 91 in which passengers may be seated on the removable seating 84, the rear window of the truck 10 may be configured to slide open or be removed from its normal position, to allow passengers within the first space 91 to communicate with passengers within the cab of the truck 10.

Figure 10:
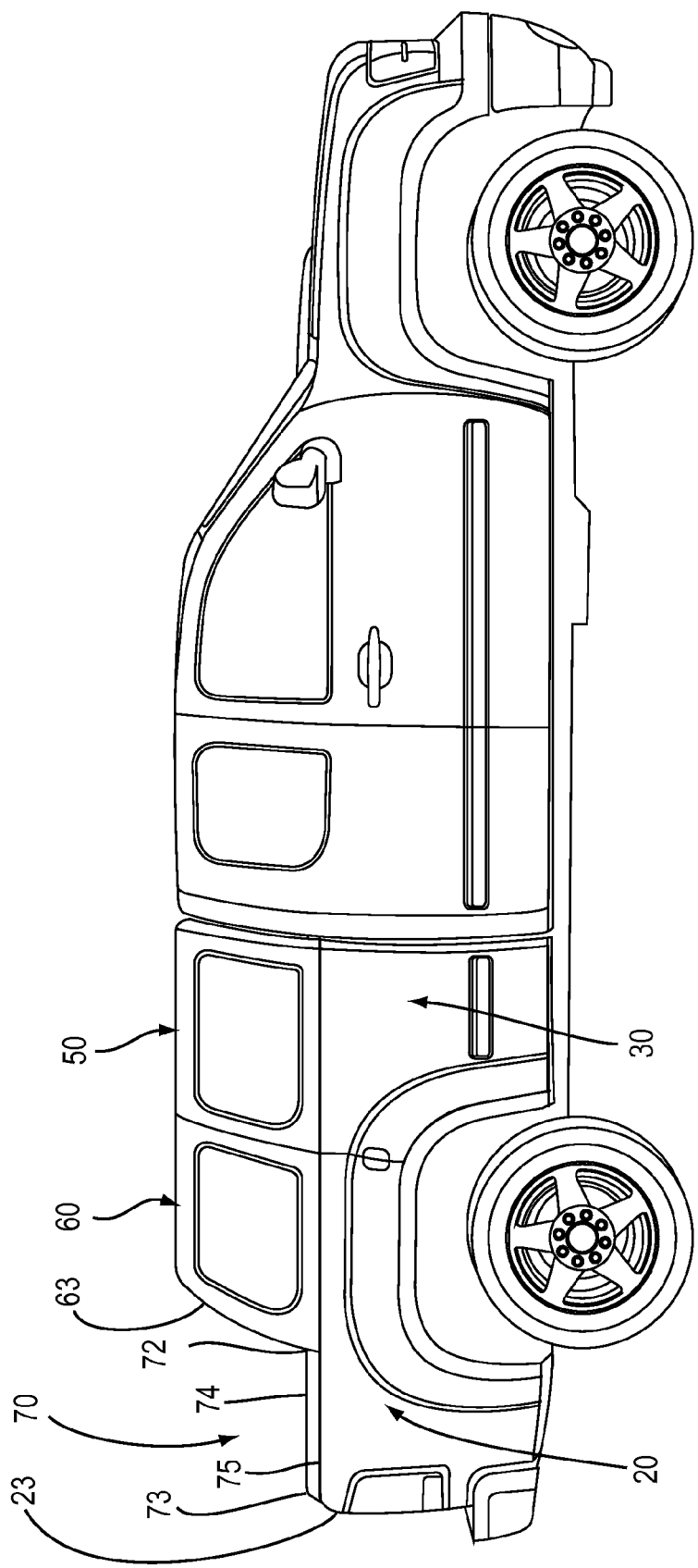
FIG. 10 is a side view of an embodiment of the utility truck in accordance with the present disclosure.
Figure 11:
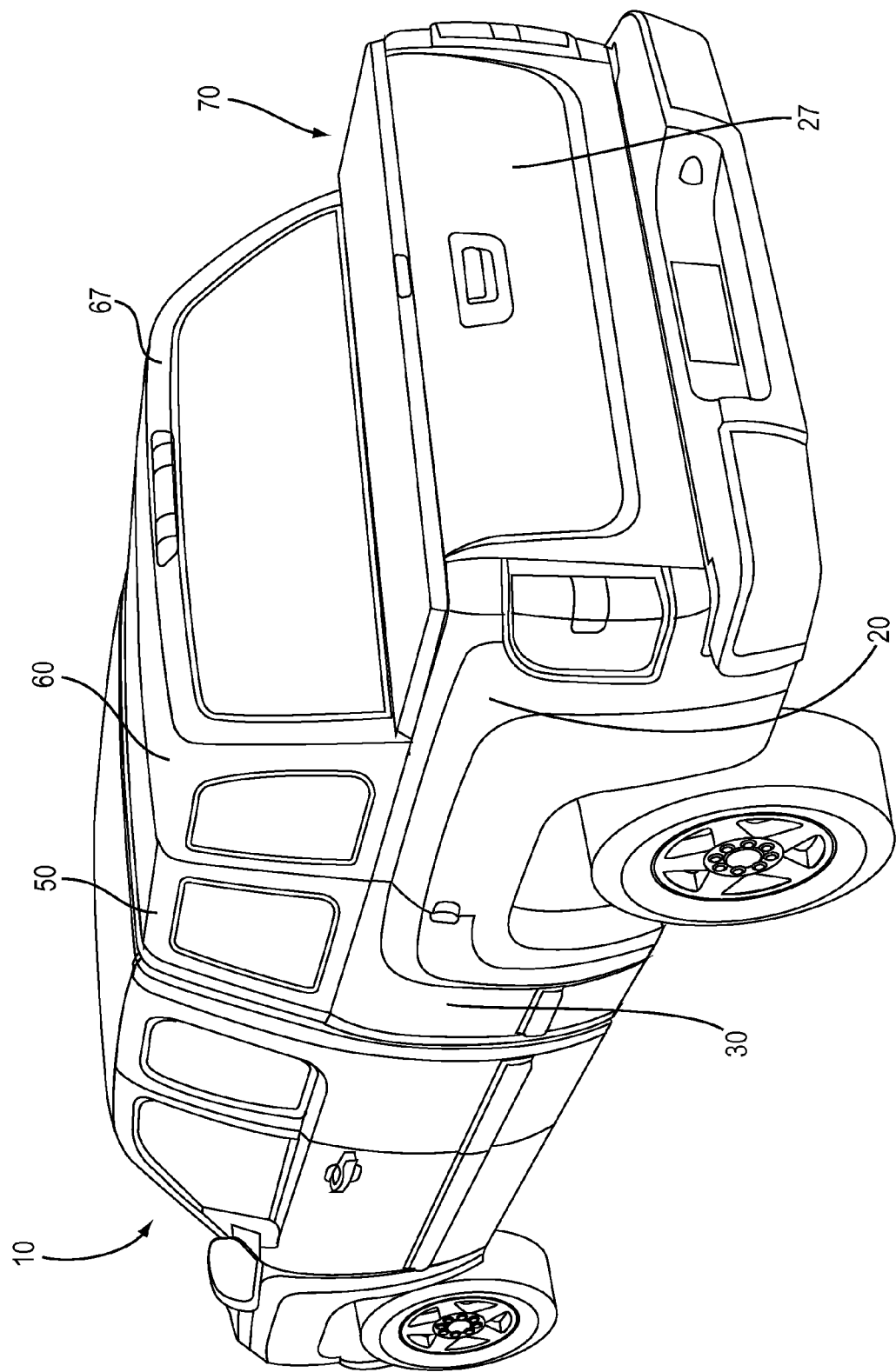
FIG. 11 is a side perspective view of an embodiment of the utility truck in accordance with the present disclosure.
Figure 12:
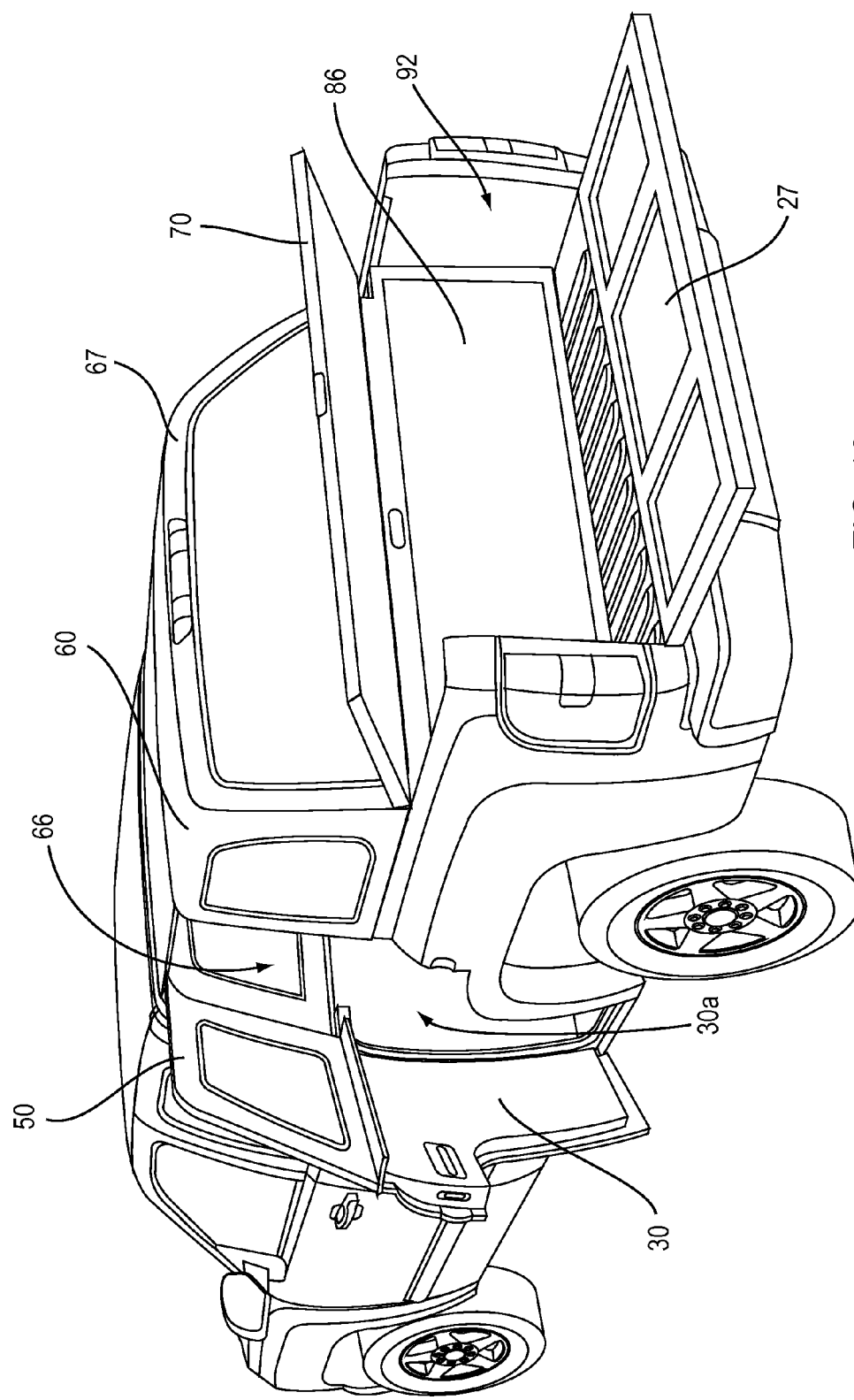
FIG. 12 is a side perspective view of an embodiment of the utility truck in accordance with the present disclosure.

As depicted in FIGS. 10-12, embodiments of the truck 10 further comprise the cap member 60 having a shorter length than the length of the truck bed 20, such that the rear end 63 of the cap member 60 terminates prior to reaching the rear end 23 of the truck bed 20. In this configuration, the rear end 63 of the cap member 60 may be configured to extend down into the truck bed 20 and contact the bed surface 12. Moreover, the rear end 63 of the cap member 60 may be further configured to functionally engage the bed surface 12 and the interior surfaces of the side walls 21. The bed surface 12 and the interior surfaces of the side walls 21 may be configured with engagement sections that are structured to functionally engage the rear end 63 of the cap member 60 that extends down into the truck bed 20 so that the rear end 63 and the corresponding engagement sections effectively seal the first space 91 from the ingress of air, wind, water, rain, and other like elements into the first space 91. Such a benefit is desirable, especially when the first space 91 is being utilized with the removable seating 84 to transport additional passengers, as desired.

In addition, embodiments of the truck 10 may further comprise a panel 86 that may be releasably and repeatedly coupled to the rear end 63 of the cap member 60 and the truck bed 20. In this way, the rear end 63 of the cap member 60 does not need to be configured to extend down into the interior space of the truck bed 20 to seal the first space 91. Instead, the panel 86 may be configured to functionally engage the rear end 63 of the cap member 60, the bed surface 12, and the interior surfaces of the side walls 21. As disclosed above, the bed surface 12 and the interior surfaces of the side walls 21 may be configured with engagement sections. The panel 86 may be configured to functionally engage these engagement sections so that the panel 86 and the corresponding engagement sections of the truck bed 20 effectively seal the first space 91 under the cap member 60 from the ingress of air, wind, water, rain, and other like elements into the first space 91. Such a benefit is desirable, especially when the first space 91 is being utilized with the removable seating 84 to transport additional passengers, as desired. A second space 92 is created behind the cap member 60 when used in this configuration. The second space 92 may be utilized as a storage space to haul, store, and place items. The second space 92 will be described in greater detail below.

Embodiments of the truck 10 further comprise the cover 70 that is configured to engage the cap member 60 that is shorter than the length of the truck bed 20. As depicted in FIGS. 10-12, the cover 70 may comprise a front end 72, a rear end 73, a top end 74, and a bottom end 75. The cover 70 may be configured to completely cover the remaining portions of the truck bed 20 to enclose the second space 92 behind the first space 91 created by the cap member 60 and the truck bed 20. The front end 72 of the cover 70 may abut or contact the exterior face of the rear end 63 of the cap member 60. Alternatively, the front end 72 of the cover 70 may approach, but not contact the cap member 60. The rear end 73 of the cover 70 may contact, or otherwise abut, the rear end 23 of the truck bed 20, but not necessarily functionally engage the rear end 23 so as to prevent the rear end 23, or the tailgate 27 positioned in the rear end 23, from releasing from the truck bed 20 and pivoting between a closed position and an open position. The side portions of the cover 70 may releasably and repeatedly couple to the top edges 24 of the truck bed 20 to secure the cover 70 to the truck bed 20. The cover 70 can be configured with a lifting mechanism to allow the cover 70 to lift off or pivot off of the truck bed 20 to provide easy and convenient access to the second space 92. Also, the cover 70 can be locked with a key, by the user, so as to prevent the cover 70 from opening and exposing the second space 92 without the user operating the key, or at least unlocking the cover 70 with the key. The second space 92 can provide a secure area wherein the user may transport objects and other items, as desired by the user.

With the extension member 50 and the cap member 60 in functional communication with the access door 30 and the truck bed 20, respectively, and the panel 86 and the cover 70 in functional communication with the truck bed 20 and the cap member 60, as depicted in FIG. 11, the user of the truck 10 may control the temperature of the first space 91 via the vents 19 and the air conditioning and heating systems, 17 and 18, in communication therewith, as schematically depicted in FIG. 16. In addition, under the condition that the cap member 60 is coupled to the truck bed 20 to create the first space 91 in which passengers may be seated on the removable seating 84, the rear window of the truck 10 may be configured to slide open or be removed from its normal position, to allow passengers within the first space 91 to communicate with passengers within the cab of the truck 10.

Figure 13:
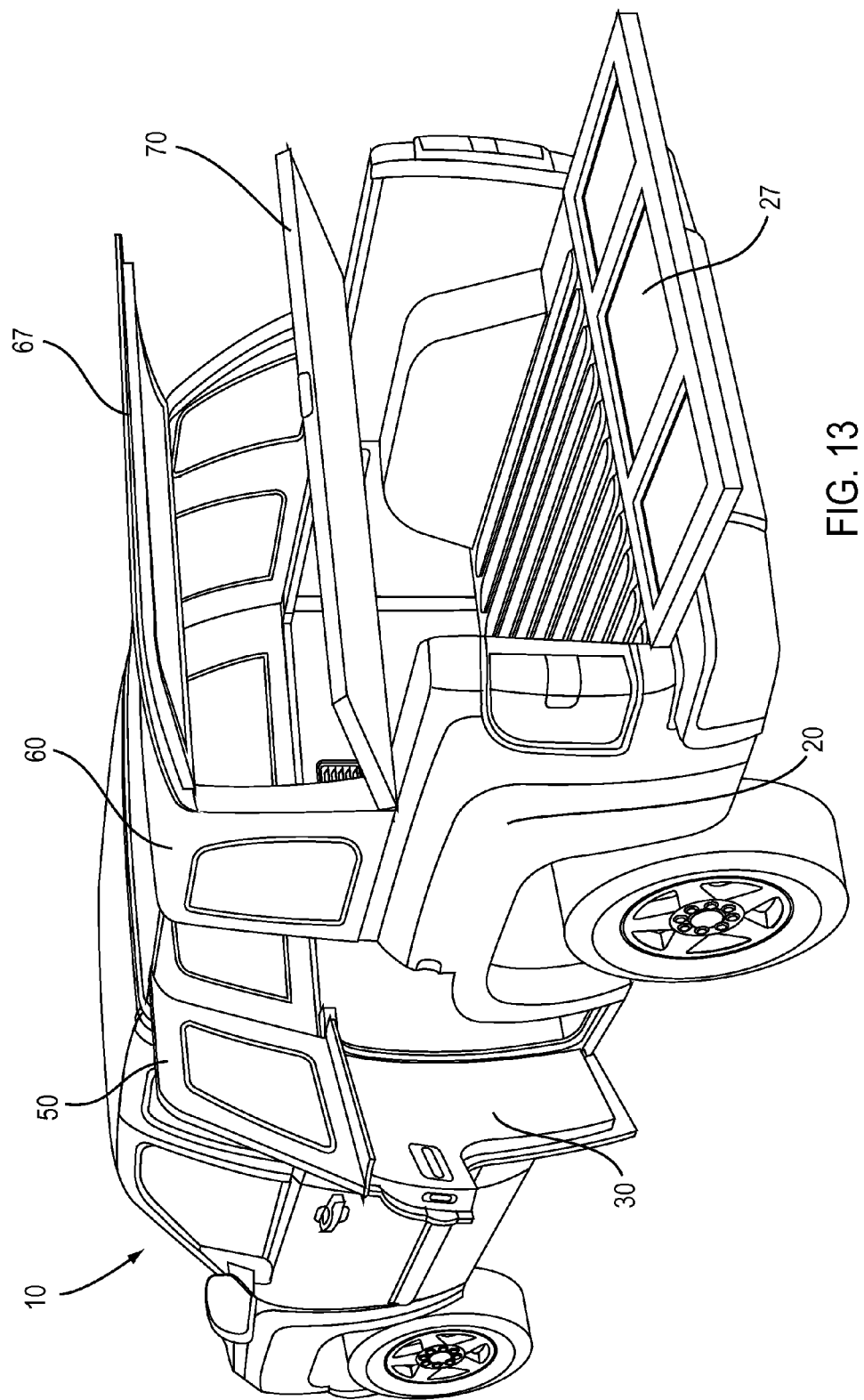
FIG. 13 is a side perspective view of an embodiment of the utility truck in accordance with the present disclosure.
Figure 14:
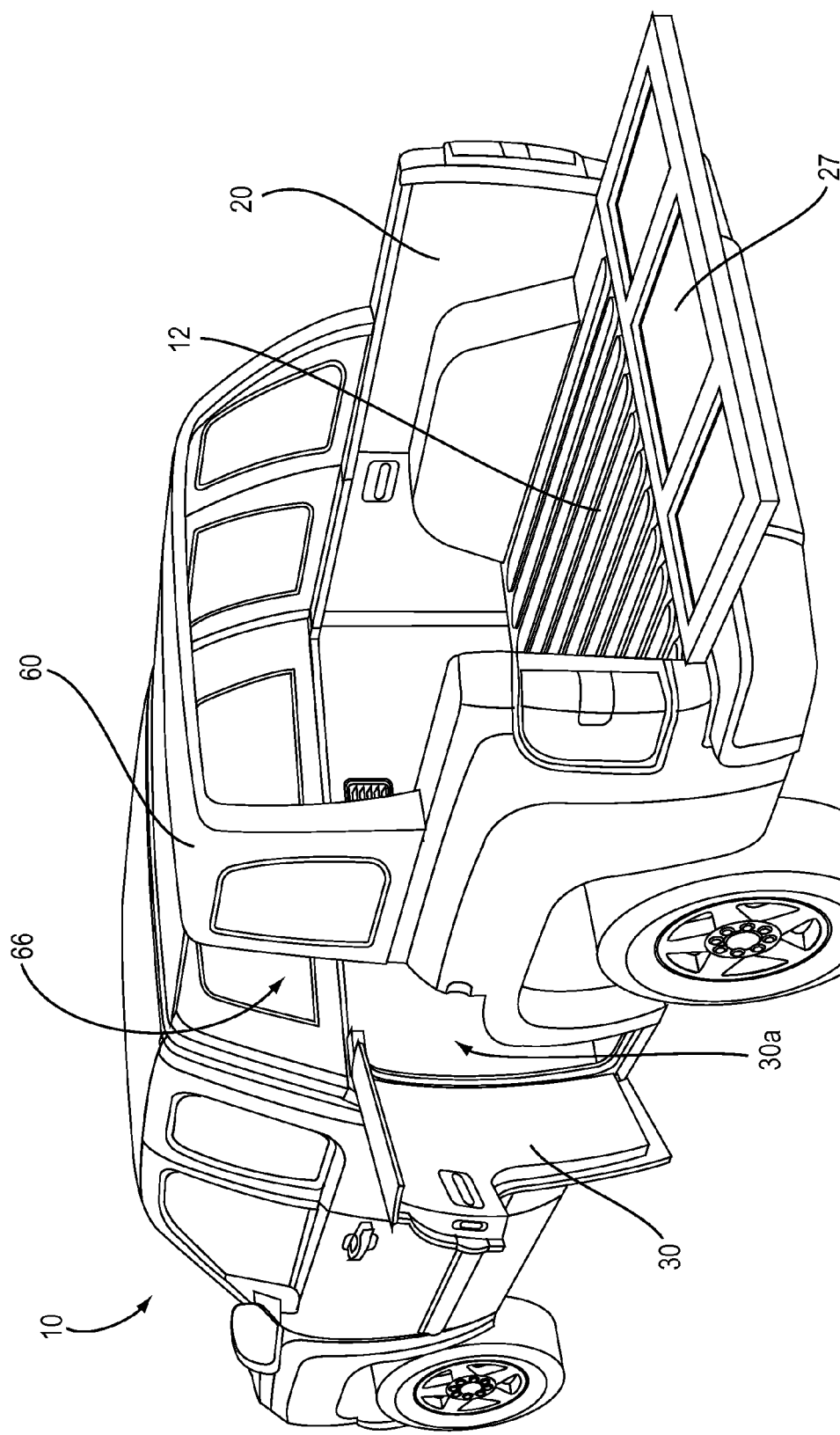
FIG. 14 is a side perspective view of an embodiment of the utility truck in accordance with the present disclosure.
Figure 15:
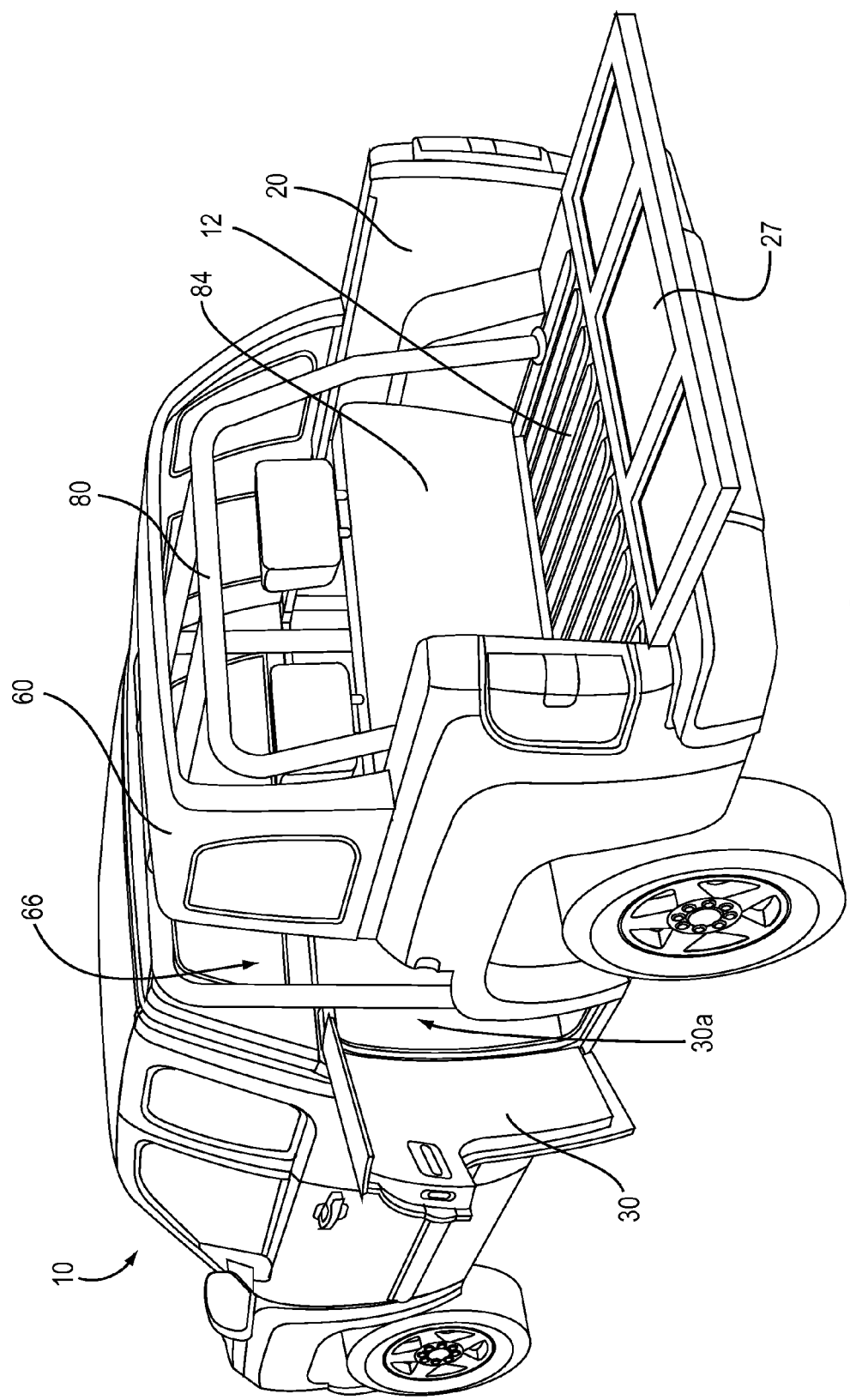
FIG. 15 is a side perspective view of an embodiment of the utility truck in accordance with the present disclosure.

Referring now to FIGS. 13-15, exemplary embodiments of the truck 10 further comprise varying exemplary configurations of the removable features of the truck 10 in accordance with the present disclosure. Embodiments of the truck 10 may further comprise the roll bar 80, the removable seating 84, and the panel 86 being removed from the interior space of the truck bed 20, such that the interior space of the truck bed 20 is an undivided, continuous, and usable space, as depicted in FIG. 13. Embodiments of the truck 10 may further comprise the lift gate 67, the cover 70, and at least one of the extension members 50 being removed from off of the truck bed 20, the cap member 60, or the access door 30, as the case may be, to further expose the interior space of the truck bed 20, as depicted in FIG. 14. Embodiments of the truck 10 may further comprise the roll bar 80 and the removable seating 84 being coupled to the truck bed 20, while the lift gate 67, the cover 70, and at least one of the extension members 50 may be removed from off of the truck bed 20, the cap member 60, or the access door 30, as the case may be. Embodiments of the truck 10 further comprise any and all combinations of the roll bar 80, the removable seating 84, the panel 86, the extension member 50, the cap member 60, the cover 70, and the lift gate 67 being functionally coupled, or otherwise functionally attached, as described herein, to the truck 10 to accessorize the truck bed 20. For example, any of the features disclosed herein, such as the roll bar 80, the removable seating 84, the panel 86, the extension member 50, the cap member 60, the cover 70, and the lift gate 67, may be separately and individually functionally coupled to the truck bed 20 and thus the truck 10, as determined and desired by the user for the intended utilization of the truck 10. Further in example, any of the features disclosed herein, such as the roll bar 80, the removable seating 84, the panel 86, the extension member 50, the cap member 60, the cover 70, and the lift gate 67, may be functionally coupled, collectively or in any lesser combination of the same, to the truck bed 20 and thus the truck 10, as determined and desired by the user for the intended utilization of the truck 10.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A utility vehicle comprising:
   a truck bed, the truck bed having side walls on opposing sides thereof that extend substantially orthogonally from the truck bed;
   an access door positioned in one side wall of the opposing side walls, the access door being configured to pivot about an axis with respect to the sidewall between a closed position and an open position;
   an opening defined in the side wall, the opening being exposed under the condition that the access door is moved to the open position and the opening being closed under the condition that the access door is moved to the closed position; and
   an extension body coupled to the access door, wherein the extension body and the access door are coupled together when moving between the open and closed positions;
   wherein the extension body further comprises a central opening defined by the extension body; and
   wherein the central opening is occupied by a transparent material.

2. The utility vehicle of claim 1, wherein a lower portion of the extension body is configured to repeatedly and releasably couple to a top portion of the access door.

3. The utility vehicle of claim 1, wherein the opening provides passenger access to the truck bed.

4. The utility vehicle of claim 1, wherein the truck bed further comprises a tailgate in an end portion thereof between the opposing side walls.

* * * * *